June 17, 1947.  R. B. CARTER, JR  2,422,394
METHOD OF DIGESTING SLUDGE ARRANGED AT DIFFERENT
LEVELS AND APPARATUS THEREFOR
Filed Aug. 3, 1945  2 Sheets-Sheet 1

INVENTOR.
RALPH B. CARTER, JR.
BY C. P. Goepel
his ATTORNEY

June 17, 1947. R. B. CARTER, JR 2,422,394
METHOD OF DIGESTING SLUDGE ARRANGED AT DIFFERENT
LEVELS AND APPARATUS THEREFOR
Filed Aug. 3, 1945 2 Sheets-Sheet 2

INVENTOR.
RALPH B. CARTER, JR.
BY
his Attorney

Patented June 17, 1947

2,422,394

UNITED STATES PATENT OFFICE 2,422,394

METHOD OF DIGESTING SLUDGE ARRANGED AT DIFFERENT LEVELS AND APPARATUS THEREFOR

Ralph B. Carter, Jr., Maywood, N. J., assignor to Ralph B. Carter Company, Hackensack, N. J., a corporation of New York Application August 3, 1945, Serial No. 608,633

2 Claims. (Cl. 210—6)

This invention relates to sewage digestion apparatus.

When tanks are used to hold sewage sludge and other similar materials it is a well known fact that such matter is digested more readily and more rapidly when anaerobic conditions prevail within the digestion tank or apparatus.

A fixed or movable cover over the digestion tank has also long been recognized as a great advantage, not only, for the reason mentioned above but to also prevent the escape of odorous gases from the tank and permit their collection for power or heat generating purposes.

The movable or so called floating cover has further advantages in providing a positive and uniform gas pressure at the gas outlet from the tank regardless of the quantity of sludge pumped into or the quantity of the supernatant liquor drawn from the tank.

In all types of sludge digestion in which there is an addition of fresh solids to sludge already in the tanks it is a fact that some lighter solids will tend to separate from the heavier solids and float. Floating solids or "scum," on the surface of the liquid, tends to retard digestion not only of the floating solids, but, also of the balance of the solids in the tank by retarding acid fermentation necessary for proper digestion. It has been demonstrated that by breaking up the surface solids or "scum," thereby removing their surface coating of toxic by-products, and permitting their more direct contact with the sludge, digestion and settling of these floating solids is greatly accelerated.

One object of this invention is to accomplish the break up and disintegration of these solids continuously and automatically without the aid of any mechanical agitating apparatus.

The travel of formed gas bubbles is upward thru the sludge, in the tank, carrying with them to the surface some of the heavier digesting solids whose further digestion would be retarded were they allowed to remain on the surface.

Another object of this invention is a process which will remove the clinging gas bubbles from the solids and allow the solids to again settle in the sludge for further rapid digestion.

The invention, briefly described, consists of sludge digestion apparatus, consisting of a sludge tank of any desired shape and construction and a cover for the tank designed to float on thin film of gas above the surface of the sludge in the tank and arranged so that the clearance space between the cover and the tank wall is sealed to prevent the escape of gas from, or the admission of air to, the tank. The cover may be formed of any suitable material satisfactory to provide sufficient structural strength and sufficient weight to maintain the maximum desired gas pressure on the gas exit. The cover has an inclined inner surface higher at its central portion than at its peripheral portion, with a plurality of substantially vertically disposed circumferentially continuous barriers spaced from each other along said inclined surface, the lower end of each successive barrier from the peripheral portion to the central portion being at a higher level than its outwardly adjacent barrier, such that a horizontal plane passing through the lower end of each barrier forms with the inner surface, a gas chamber for discharging gases at the higher barrier.

The invention consists also in the improved method of digesting sludge which consists of sludge arranged in successively different levels, which consists in subjecting the upper portion of each next higher level to the accumulated gases emanating from the adjacent lower level of sludge of varying masses of sludge by submerging the accumulated gases below the next higher level to disturb and break up its floating particles, whereby the particles of said higher level will be freed of their gases, and their surface coating of by-products, which tend to inhibit complete digestion.

The usual means are provided in the cover for collecting and drawing off the gases found in the tank, also, the usual means are provided in the apparatus for admitting undigested sludge to the tank and drawing off digested sludge and supernatant liquor.

The invention will be further described hereinafter, embodiments thereof shown in the drawings, and the invention will be finally pointed out in the claims.

In the accompanying drawings.

Similar characters of reference indicate corresponding parts throughout the various views.

Figure 1:
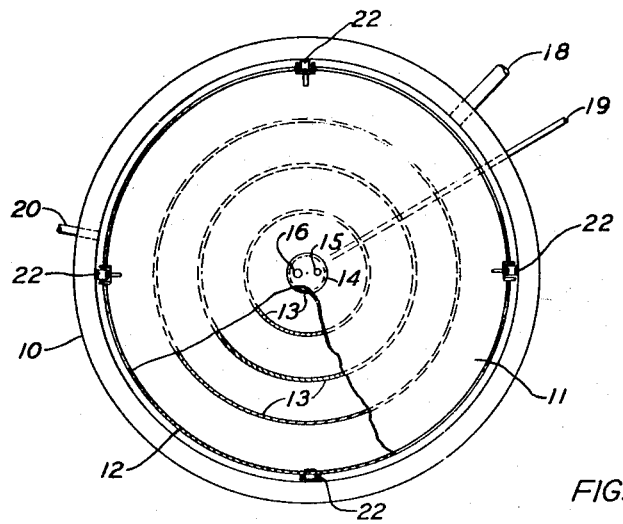
Fig. 1 is a plan view of the apparatus constructed in accordance with the invention.

Referring to the drawings, in the particular form illustrated, there is shown a sludge tank 10 of concrete, steel or other suitable material.

The open top of the tank is closed by a cover 11 of steel or other suitable material. The cover is so constructed that its total weight will be sufficient to maintain the desired gas pressure and has an outer vertical lip 12 extending both upwardly and downwardly from the outer edge of the cover 11. The upper portion 12a of the lip forms with the surface of the cover, a vessel having a greater displacement than that of an equivalent amount of the liquid in the tank causing the cover to float on a thin film of trapped gas under the cover. The lower portion 12b of the outer lip 12 forms with the surface of the cover, the liquid in the tank and the wall of the tank, a liquid seal preventing the escape of gas, or the entrance of any air.

Figure 3:
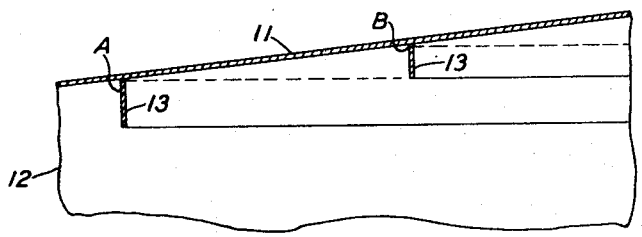
Fig. 3 is a fragmentary view, showing an enlarged section.

The cover of the tank 11 is domed in shape having its central portion elevated above its outer periphery, and, having on its under side concentric rings 13 extending downwardly a distance in definite relation to the degree of angularity of the dome-shaped cover from the horizontal. These rings 13 form gas traps under the cover maintaining definite and controllable gas film depths at and between points A and B of Fig. 3.

The lip 12 is preferably provided with rollers 22 to assure free movement of the cover as intended.

Figure 2:
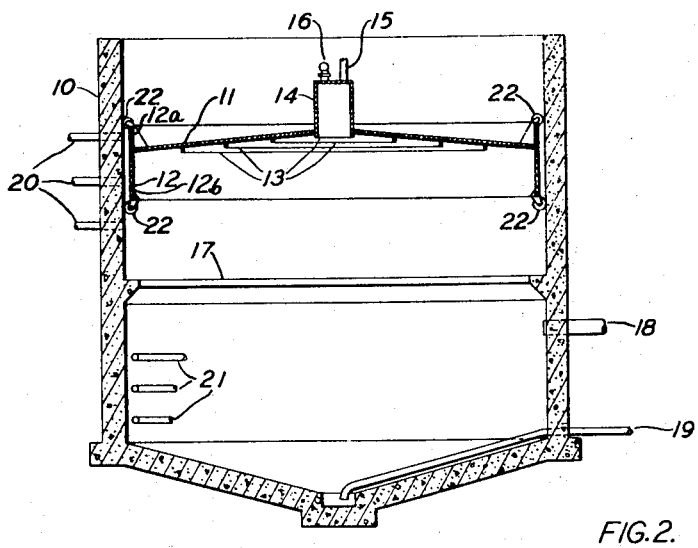
Fig. 2 is a sectional elevation, taken on a central section.

A chamber 14 is centrally located in the cover for the collection of gas (in excess of that trapped under the cover), and a discharge pipe 15 is connected to or thru chamber 14 to lead off these gases to a storage tank for future use. This pipe 15 is shown in Fig. 2, but omitted in Fig. 4.

The chamber 14 may also be provided with a relief valve and flame arrestor to relieve any excess gas pressure formed.

A shelf or stops 17 are provided to prevent the cover 11 from sinking below a predetermined point in the tank due to a lack of liquid content.

Raw sludge inlet connections 18, digested sludge outlet line 19, supernatant draw off lines 20, and heating coils 21 complete the basic layout.

The operation is as follows:

In operation the empty tank is filled with sludge and water to the desired level and all entrapped air (with the exception of that air trapped under the cover by the concentric rings 13) is vented thru pipe 15 or relief 16.

Figure 4:
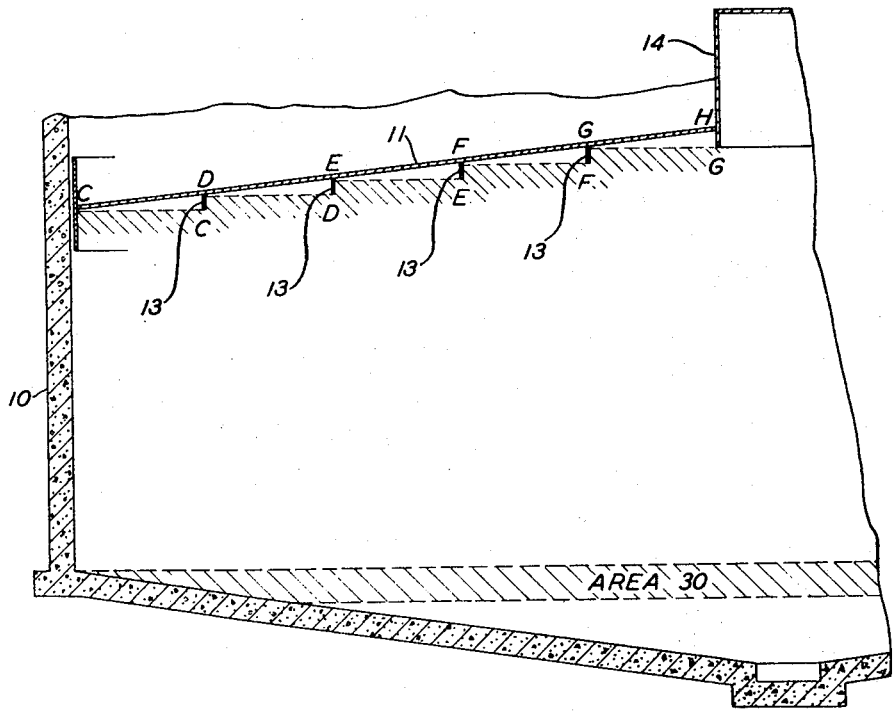
Fig. 4 is an enlarged sectional elevation view of one side of the tank.

The sludge digestion process is then allowed to take its normal course as follows:

All floatable solids in the tank rise to and form the sludge surface as outlined by the stepped surface line C—C, D—D, E—E, F—F, G—G in Fig. 4. All heavy solids settle to the bottom of the tank in the general form of area 30 of Fig. 4. The volume between becomes relatively clear water and as digestion progresses, supernatant liquor.

As digestion proceeds either at existing temperatures or with the aid of additional heat provided by the heating coils 21, gas bubbles are formed in the settled sludge, these bubbles rising to the surface carry with them some of the settled partly digested sludge, arriving at the surface the larger of these bubbles burst into the entrapped sections of Fig. 4 (CCD, DDE, EEF, etc.), which then become partially air and gas filled. In complete operation all air is expelled and gas only retained. However, some of the smaller gas bubbles still cling to the solids maintaining a percentage of them at the liquid surface. As additional gas is formed in the settled sludge and rises to the surface it is, also, discharged into the trapped sections CCD etc., these then reach a point at which the continuous addition of gas causes the gas film to press down and overflow the concentric rings into the next trapped section.

This in actuality creates a resubmergence of the free gas into and below the surface of the sludge to a controllable depth as indicated by the depth of the concentric rings, or the sections CD, DE, EF, etc.

This positive resubmergence causes many desirable things. (1) It commingles with and removes from the heavier solids the gas bubbles attached to them allowing them to sink again, to the bottom, for additional digestion. (2) It causes an intense surface agitation breaking up the lighter solids and maintaining them in a continuously moist condition furthering rapid digestion which causes them to sink, and, (3), it starts and maintains a flow in the general direction of the center surface of the cover where due to the greatly decreased diameter of the inner concentric ring or rings and the increased gas volume, violent agitation rapidly destroys any remaining floating solids causing them to sink to the bottom.

Contrary to existing methods, and reference is here made to the Downes Patent #1,717,100 of June 11, 1929, where there is no resubmergence of freed gases and only agitation at the center surface of the tank; in my method and apparatus, there is continuous and materially great agitation at the surface points contacted by the concentric rings, causing a downward path for the heavier solids, freed of their gas bubble attachments and the broken up lighter solids throughout practically the whole area of the tank, leaving only the lightest gas entraining solids at the surface, where they are always in position to receive the maximum agitative effect.

Moreover, as there is a general moving of the surface solids towards the center, there tends to be maintained throughout the center vertical section of the tank the lightest solids, where, any attempt to rise encounters the most violent agitation, until, after complete digestion, they sink permanently to the bottom to be drawn off.

It is advantageous to "seed" the incoming raw sludge with actively digesting sludge. My method creates ideal conditions for this seeding, passing the digesting sludge (caused to float upwardly by the attached gas bubbles) from the lower portion of the tank thru the raw sludge in the central portions of the tank, and then (after being freed of the supporting gas bubbles) downward again throughout the raw sludge in the whole lower tank area, and not as in Patent #1,717,100 downward only thru the center tank area. Also, the sludge may be heated, and the digestion accelerated thereby.

It will be noted that the escaped gases are resubmerged, and at definite intervals, and at increasing velocities, and a plurality of times, and are collected.

The word "ring" has been used since in the embodiment shown these members are circular, and the word "concentric" has been used because these rings are concentric. However, these barriers need not be circular, or concentric. Any suitable shape, as square, hexagonal, etc., with the barriers suitably spaced may be used.

The improvement in the apparatus is in the disposition and functioning of these barriers.

From the foregoing, it will be seen that an apparatus and a method of sludge digestion has been created causing more complete and more rapid digestion.

I have described several forms of my invention, but obviously various changes may be made in the details disclosed without departing from the spirit of the invention.

I claim:

1. The method of digesting sludge which consists of sludge arranged in successively different levels, which consists in subjecting the upper portion of each next higher level to the accumulated gases emanating from the adjacent lower level of sludge of varying masses of sludge by submerging the accumulated gases below the next higher level to disturb and break up its floating particles, whereby the particles of said higher level will be freed of their gases, and their surface coating of by-products, which tend to inhibit complete digestion.

2. In a sludge digestion apparatus having a tank with an open top, a floating cover for the open top of the tank with an inclined inner surface higher at its central portion than at its peripheral portion, and having sealing means at said peripheral portion, and a gas outlet at its central portion, the combination of a plurality of substantially vertically disposed circumferentially continuous barriers spaced from each other along said inner surface, the lower end of each successive barrier from the peripheral portion to the central portion being at a higher level such that a horizontal plane passing through the lower end of each barrier forms with the inner surface, a gas chamber for discharging gases at the higher barrier, whereby said cover floating on the upper surface of the sludge in the tank, enables the particles of the sludge at said higher level to be freed of other gases, and their surface coating by products which tend to inhibit complete digestion.

RALPH B. CARTER, Jr.

REFERENCES CITED

The following references are of record in the file of this patent:

UNITED STATES PATENTS

| Number | Name | Date |
| --- | --- | --- |
| 1,690,682 | Imhoff et al. | Nov. 6, 1928 |
| 1,717,100 | Downes | June 11, 1929 |
| 1,820,977 | Imhoff | Sept. 1, 1931 |
| 1,855,982 | Mohr | Apr. 26, 1932 |
| 1,102,553 | Seubert | July 7, 1914 |
| 1,936,305 | Leffler | Nov. 21, 1933 |
| 1,922,547 | Mason | Aug. 15, 1933 |
| 2,188,847 | Streander | Jan. 30, 1940 |
| 2,043,119 | Pruss | June 2, 1936 |
| 1,609,830 | Pruss | Dec. 7, 1926 |
| 1,983,058 | Wait | Dec. 4, 1934 |
| 1,407,389 | Lhorbe | Feb. 21, 1922 |

FOREIGN PATENTS

| Number | Country | Date |
| --- | --- | --- |
| 471,003 | Great Britain | Aug. 26, 1937 |
| 582,801 | Germany | Aug. 23, 1933 |
| 254,447 | Germany | Dec. 3, 1912 |